United States Patent [19]

Anderson

[11] Patent Number: 5,921,324
[45] Date of Patent: Jul. 13, 1999

[54] DEVICE FOR CLEARING AND SEEDING RANGE LAND

[76] Inventor: Ray W. Anderson, P.O. Box 363, Burns, Oreg. 97720

[21] Appl. No.: 09/260,877

[22] Filed: Mar. 2, 1999

Related U.S. Application Data

[63] Continuation-in-part of application No. 08/751,854, Nov. 18, 1996., abandoned

[51] Int. Cl.$^6$ .................................. A01B 3/24; A01B 5/04
[52] U.S. Cl. .......................... 172/176; 172/177; 172/554; 172/684.5; 172/690; 172/701.3; 172/733; 172/611
[58] Field of Search ..................................... 172/176, 177, 172/540, 554, 684.5, 690, 701.3, 733, 772, 772.5, 611

[56] References Cited

U.S. PATENT DOCUMENTS

| | | | |
|---|---|---|---|
| 3,963,079 | 6/1976 | Carlucci | 172/690 X |
| 4,237,984 | 12/1980 | Cobb et al. | 172/554 |
| 5,213,164 | 5/1993 | Mork | 172/684.5 X |

FOREIGN PATENT DOCUMENTS 1339947  9/1963  France ..................................... 172/733

*Primary Examiner*—Christopher J. Novosad
*Attorney, Agent, or Firm*—Davis Wright Tremaine

[57] ABSTRACT

The invention comprises an apparatus for clearing range land of sagebrush an other invading non-grazing plant species. The device is adapted to be towed by a tractor, and has a pair of blades arranged in a "V" configuration, with the point of the "V" facing forward. The device is adapted to float on the ground surface so as to not bind on immovable embedded objects. Removable knife blades on the lower, ground-engaging surfaces of the blades shear off or pull out brush. A roller having roller blades on the surface mulches the just-cleared land in preparation for seeding. A seeding apparatus may be affixed to the device to immediately apply native grasses and other forage plants.

7 Claims, 6 Drawing Sheets

DEVICE FOR CLEARING AND SEEDING RANGE LAND

CROSS-REFERENCE TO RELATED APPLICATIONS

This is a continuation-in-part of U.S. application Ser. No. 08/751,854, filed Nov. 18, 1996, now abandoned.

BACKGROUND

The present invention relates to devices for clearing large areas of noxious weeds and shrubs so that such areas may be returned to more effective grazing land. In particular, the present invention relates to a device having a (i) "V"-shaped scraper portion and a (ii) roller having knives mounted thereon for clearing and preparing an area for the introduction of grass seed.

A combination of factors have conspired over the past 40–50 years to render a large portion of the Western United States less than optimal range land. At the turn of the century, vast portions of the Western high desert were densely covered with highly nutritious range grasses, supporting large bison, and later domesticated cattle, populations. However, over grazing and artificial control of range fires have provided the opportunity for numerous unpalatable shrub species to invade and out-compete the native grasses. Historically, naturally occurring fires burned large areas and acted as a check on the growth of non-climax shrubs, such as sagebrush, rabbit brush, snake weed, juniper and saplings. Modern fire control techniques have essentially eliminated fire as a weed-control mechanism, and when combined with grazing intended to maximize the carrying capacity of dry land range, have provided a ripe environment for proliferation of noxious weeds and shrubs.

After the invasion of such weeds (hereinafter, the full range of noxious invaders will be shortened to "sagebrush", although it is to be understood that such word includes the others noted above), little has been done to reclaim the range land back to its original condition. Numerous methods for sagebrush control have been proposed, none with any degree of widespread success. For example, devices are available to burn off individual sagebrush plants without starting range fires. Likewise, chemicals have been attempted but with little or no success—either they were not effective to kill mature plants, or they were too expensive, left a toxic residue, or killed virtually everything and permitted sagebrush, not grasses, to immediately invade. Mechanical devices have been attempted, such as so-called "brush-hogs" and disking/plowing. However, the latter was incapable of destroying a mature plant, while the former required too much power, such as a tracked tractor or a 6–8 wheel drive vehicle, with the consequent increased cost of operation.

The prior art methods of control, if marginally effective at all, were limited to treatment of approximately 5 acres per day, not great enough treatment to be economically viable. It is believed that it will be necessary to treat at least 40, and preferably 80, acres per day, with lower cost 2-wheel drive tractors, in order to make it feasible to clear large quantities of sagebrush-infested areas.

Accordingly, it is an object of the present invention to provide an apparatus which can be towed by a conventional 2-wheel drive tractor over an area of range land infested with sagebrush, thereby clearing the sagebrush for the planting of grass seed. It is a further object of the present invention to provide a method for the clearing of sagebrush-infested range land and the simultaneous planting of grass seed, thereby returning the range land to its more normal grassland state.

SUMMARY OF THE INVENTION

The present invention comprises an apparatus for clearing land of loose trash and noxious plants. The apparatus comprises generally a frame member upon which are mounted both a scraper member and a roller member. The scraper either cuts off ("decaritates") or pulls out by the roots noxious plants. The roller then mulches the scraped area, preparing it to more readily accept and retain rainfall, and subsequent seeding. The apparatus is especially adapted to remove noxious shrubs while not destroying native grasses. Indeed, the device provides an ideal environment for reseeding of grasses after removal of such shrubs.

The scraper member comprises a pair of scraper blades arranged in a "V" configuration, with the closed, pointed end of the "V" pointing forward in the direction of travel, and the open end of the "V" pointing rearwardly. Each of the scraper blade is provided with a removable/replaceable scraper knife affixed to a lower ground-engaging portion of the scraper blade. The roller, affixed to the frame behind the scraper blades rearward of the open end of the "V"-shaped scraper blades, is provided with a plurality of removable blades mounted on the surface of the roller. The blades may be arranged either coincident with the axis about which the roller rotates, or they may be arranged at an angle thereto.

In a preferred embodiment, the scraper member is mounted to the frame such that it "floats" on the surface of the ground over which it is pulled. As the scraper members encounter obstructions, such as embedded rocks, hummocks, etc. it is advantageous for the device to ride over such obstructions rather than risk undue damage to the device. In a further preferred embodiment, a plurality of the devices of the present invention may be mounted in a "gang" configuration in order to increase the effective width of a single pass through infested range land. In the event the present invention is utilized to clear sagebrush-infested land for grazing, it is contemplated that the present invention will further comprise a grass seeding device affixed to the rear of the frame member in order to complete the clearing and seeding process in a single pass.

The roller of the present invention produces a "no-till" mulching of the soil while the removable blades leave indentations in the soil that gather and retain moisture and provide an ideal seed bed for growth of grasses which are protected from the drying effects of wind and grazing of animals.

While it is anticipated that the present invention will be used primarily for the clearing and seeding of range land, it is contemplated that a secondary use of the apparatus is to perform a leveling function, either on range or agricultural land. Because the scraper members are provided with a blade that is adapted to penetrate into the ground at least a few inches, significant earth may be "tilled" by the device. Additionally, it is contemplated that the apparatus will be used for a leveling/trash clearing function along roadways. When pulled laterally down the earth shoulder of a roadway, the present invention will not only clear weeds and shrubs, but will also clear trash improperly disposed of from passing vehicles.

It will be readily apparent that in any of the possible use environments, the "V" configuration of the scraper blades will produce a "wind row" effect on materials displaced by the blades. Whether it be sagebrush in the open range, or weeds and trash adjacent a roadway, such effect will make subsequent retrieval or treatment much more easy.

DETAILED DESCRIPTION OF THE INVENTION

Figure 1:
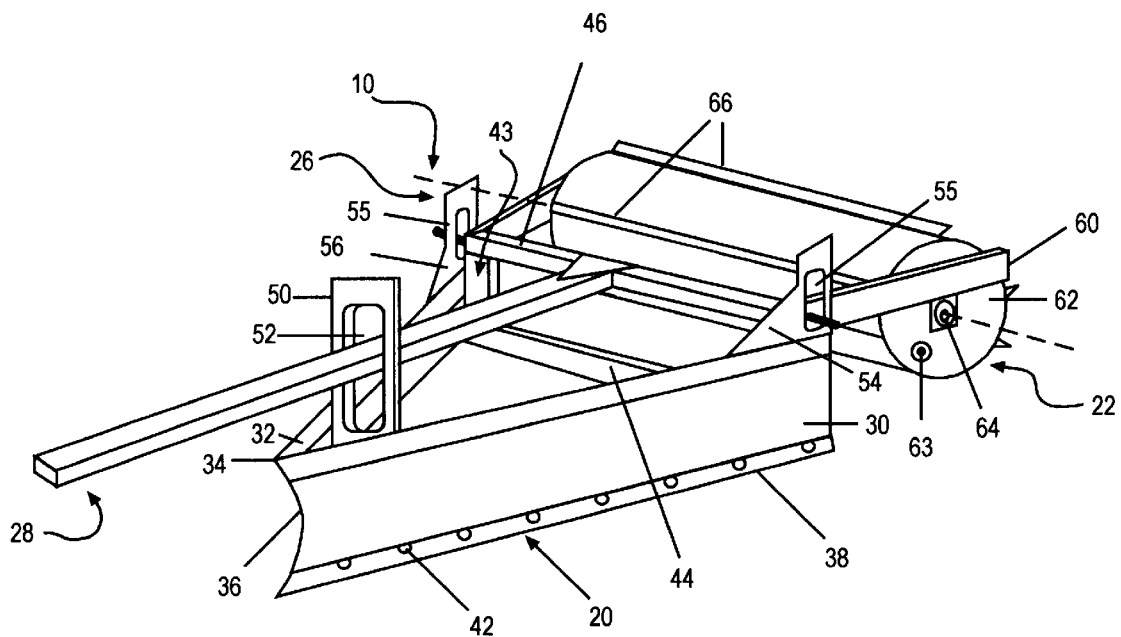
FIG. 1 is a perspective view of the apparatus of the present invention.

As illustrated in FIG. 1, the device of the present invention, designated generally at 10, comprises a forward "V" shaped scraper member 20 and a more rearward roller member 22. Each of these members is affixed to a frame portion 26, such that the closed, pointed portion of the "V"-shaped scraper member 20 points forwardly, with the roller member 22 trailing the scraper member 20. A hitch member 28 affixes the device to a tractor (not shown) or other suitable towing device. It is contemplated that a tracked vehicle or under certain conditions, a heavy-duty truck, may also be used to tow the present invention.

More specifically, the scraper member 20 comprises a pair of scraper blades 30, 32 which are joined into a "V" shape, at 34, forming a leading edge 36. Preferably, the leading edge 36 of the scraper member is provided with a rounded profile so that impact with an immovable obstruction will not cause undue damage. As illustrated, the blades 30, 32 are arranged such that they define an interior angle of approximately 65 degrees; however they may be arranged at any angle sufficient to effect the desired result. While the blades 30, 32 may be made of any suitable material, it has been found that relatively heavy gauge I-beams of a wear-resistant steel work exceedingly well because of their inherent strength and long wear, as well as their considerable weight. Each of the blades 30, 32 is provided with a replaceable knife portion 38, 40. The knives are preferably made of a suitable steel that is hard enough to resist denting and damage from expected impacts, but soft enough to resist breaking, and are removably affixed to the lower edge of the blades, as by a plurality of bolts 42.

In order to maintain the appropriate configuration of the apparatus under the extreme stresses anticipated during use, a frame member 26 is placed between the blades 30, 32 to ensure proper alignment between the blades relative to one another. The frame member 26 is rectangular and comprises two horizontal braces 44 and 46 and two vertical braces 43 and 45, all of which are welded together at their ends to form a rectangular shape. Rearwardly-projecting arms 60 are welded to the frame member 26 to provide for attachment of the roller 62. The frame member 26 is positioned between the rearmost portions of the scraper blades and is engaged by a pin, bolt, etc., in the slots 55 cut into elements 54 and 56. By mounting the frame 26 in slots, the frame can resist the forces exerted on the blades while allowing the blades to "float" relative to the roller. In the embodiment illustrated, the hitch 28 is rigidly affixed to the brace 46, and is retained within guideway 50. The guideway 50 is affixed to the blades 30, 32 and is provided with an aperture 52 through which the hitch is disposed, permitting the blades 30, 32 to "float" upwardly or downwardly responsive to irregular or inconsistent ground surface conditions, such as rock outcroppings, large embedded rocks, hummocks, and the like.

Figure 5:
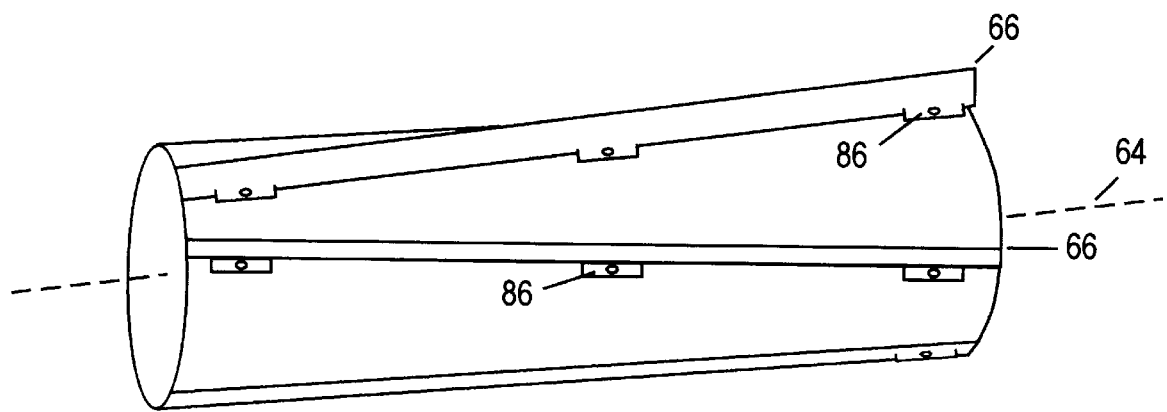
FIG. 5 is an isolated view of the roller of the present invention.

The roller member 62 is secured to the arms 60 of the frame 26 rearward of the scraper member 20. The roller 62 is preferably constructed of heavy gage steel, and is adapted to be filled with a material (such as water) that will add weight to the roller. A sealable portal 63 is placed on the side of the roller 62 to allow the material to be inserted, kept within, and removed from the roller. Other means could also be used to permit filling and emptying of the roller, for example a simple valve or a sophisticated check valve. The roller 62 rotates about an axis of rotation 64, and is provided with a plurality of replaceable/removable blades 66 which are secured to the surface of the roller. The roller blades are configured in any one of a number of positions. For example, as illustrated in FIG. 5, adjacent blades may be positioned at an angle to the axis 64 about which the roller rotates so that plant materials will be fed laterally across the surface of the roller to increase the mulching action of the roller. Alternatively, the roller blades may be positioned parallel to the axis 64. The blades are removably secured to brackets 86 which are welded to the roller.

Figure 2:
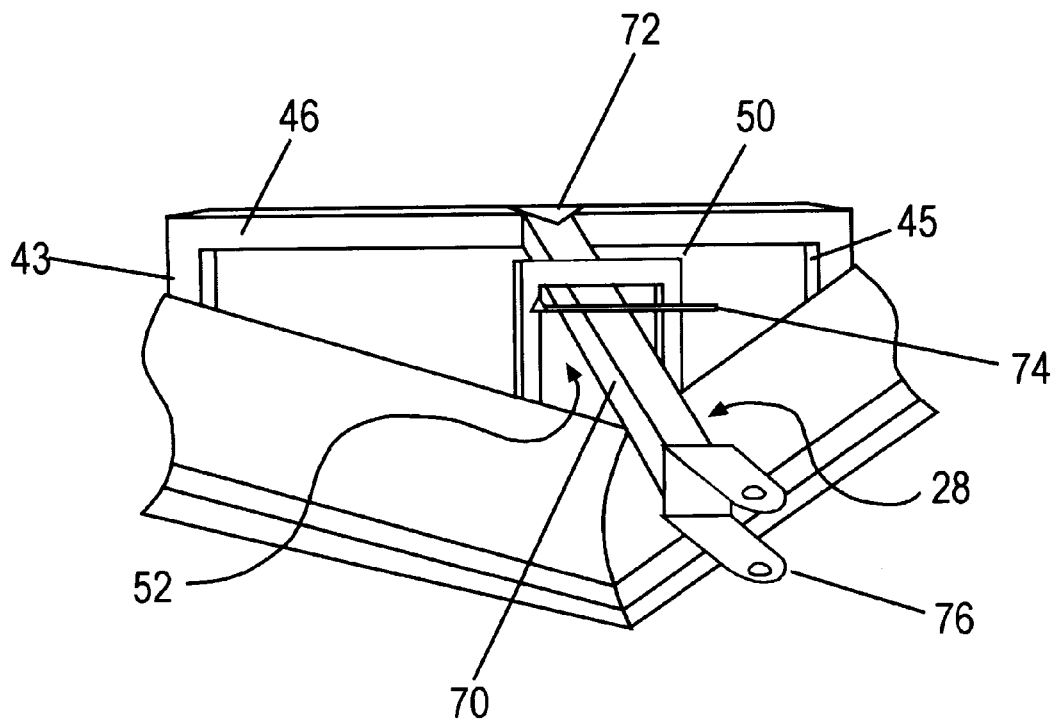
FIG. 2 is an isometric view of the apparatus of the present invention when viewed from the front.
Figure 3:
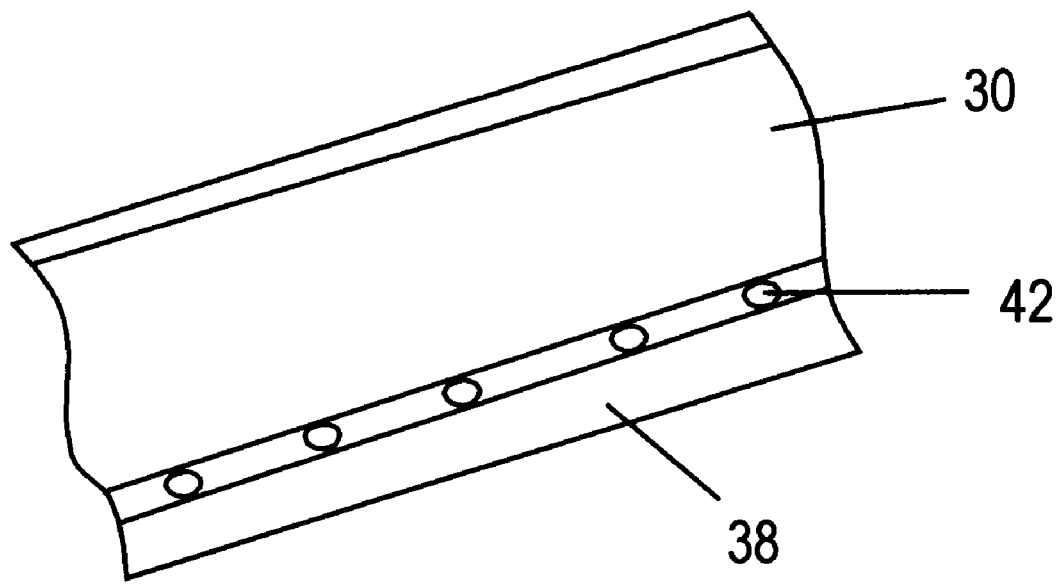
FIG. 3 is a partial, enlarged view of a blade member of the present invention.

Referring more specifically to FIG. 2, the mounting of the hitch 28 and the alignment of the blades 30, 32 is illustrated. The hitch bar 70 is rigidly secured to the brace 46 at 72. A movable pin 74 may be utilized to limit the movement of hitch bar 70 within aperture 52. A conventional hitch mount 76 is provided with which to mount the device to a tractor, truck, or other towing vehicle.

The knife portions 38, 40 are secured to the respective blade member 30, 32 in a manner that permits their easy and frequent replacement. Because it is contemplated that this device will be utilized in range land, it is virtually assured that numerous large and small objects, such as rock outcroppings or loose, but embedded, rocks will be encountered. When encountering large shrubs, the replaceable knife portions are designed to either shear off ("decapitate") the shrub at or near the ground surface, or to pull up the shrub by the roots. In either case, the sagebrush 80 is "wind rowed" 82 (FIG. 4), leaving a swath 84 essentially clear of shrubs.

Figure 4:
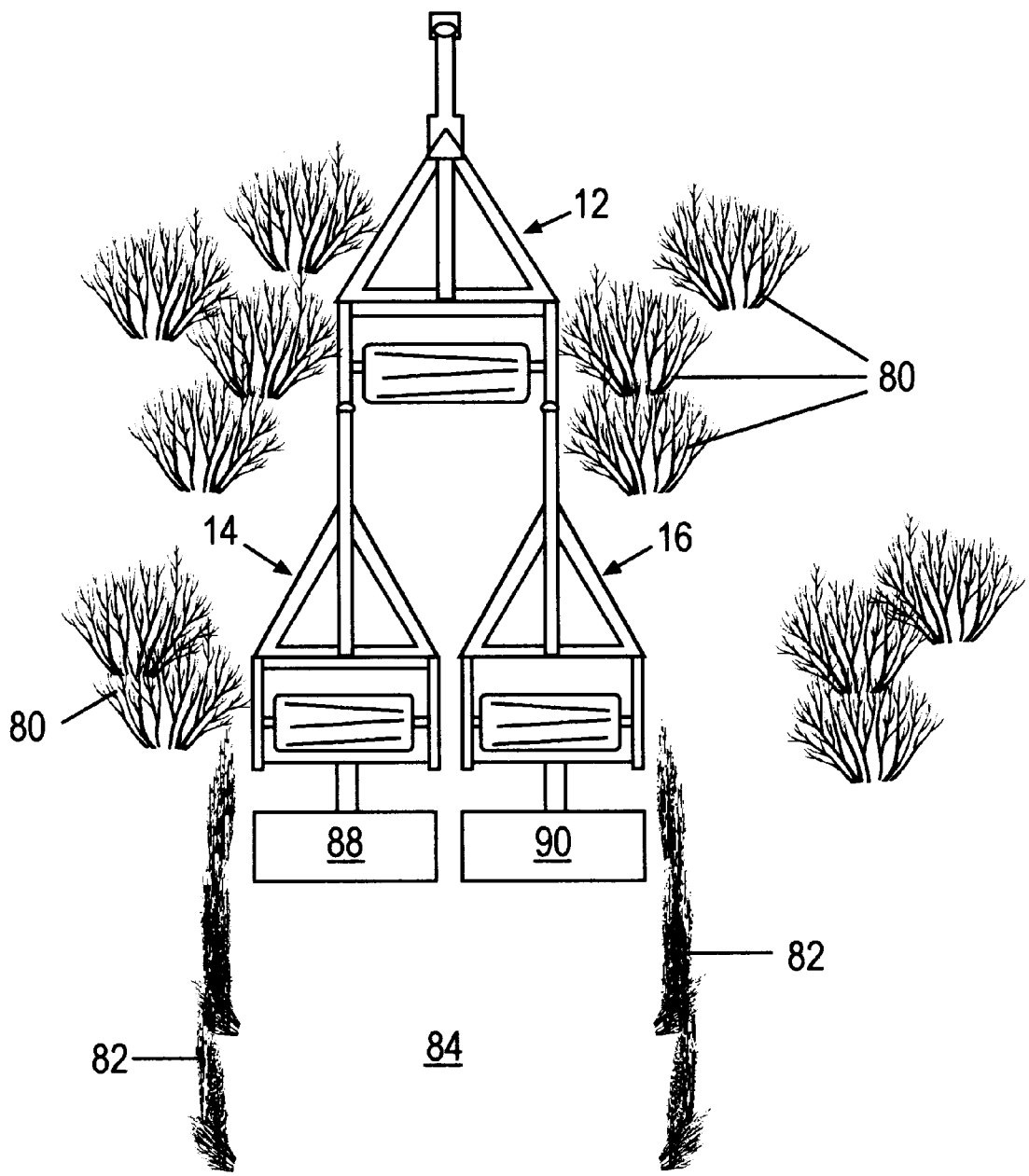
FIG. 4 is an overhead schematic view of one embodiment of the apparatus of the present invention when in use on range land.

As illustrated in FIG. 4, a number of the units 12, 14, 16 described above may be mounted together in a "gang" so as to increase the effective width of the pass, thereby creating a wider swath 84 of cleared range land. The individual units may be provided with a seeding attachment 88, 90 so that as the land is cleared, seeds may be sown into the newly cleared land. The seeder may be either a drop or broadcast seeder. It is contemplated that grass seeds and other plants native to the particular area will be sown after sagebrush is cleared, thereby increasing the grazing potential of the range land.

Figure 6:
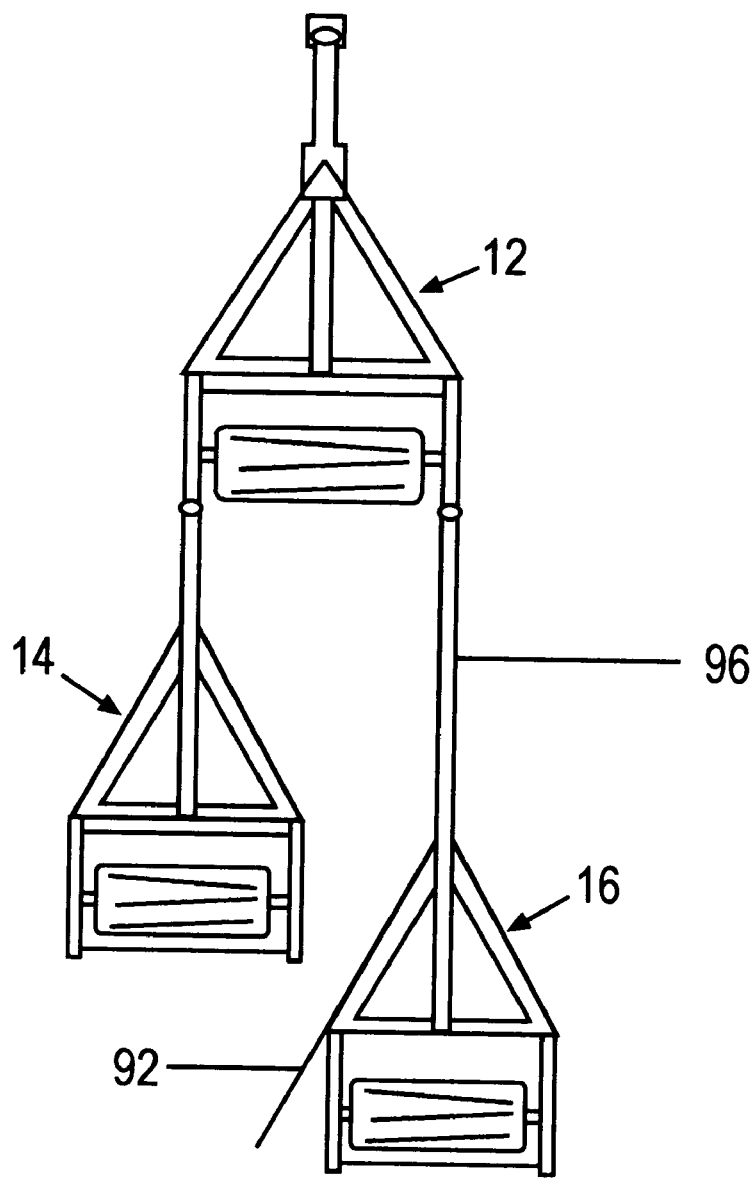
FIG. 6. is a schematic view of an alternative embodiment illustrated in FIG. 4.

In an alternative embodiment shown in FIG. 6, one of the inner blades 92 of unit 16 is extended beyond the termination of the inner blade 94 of unit 14, such that there is complete coverage of the ground surface in a single pass. The arrangement of FIG. 6 necessitates a longer hitch bar 96 so that the unit 16 may be positioned rearwardly far enough for elongated blade 92 to clear adjacent blade 94.

The apparatus of the present invention relies upon the significant weight of the apparatus to effect the "decapitation" of well-entrenched, hardy plants such as sagebrush. The weight of to the blades 30, 32 must be great enough to overcome the considerable resistance offered by a mature sagebrush without being deflected away from the brush. The weight of the device will ensure that the knife portions 38, 40 remain at or just below ground level, ensuring that the area treated is scraped clean of noxious weeds and shrubs. It is contemplated that the device can be configured to penetrate into the earth a distance of up to approximately one-third the height of the blades 30, 32. While significant leveling is not anticipated with the present invention, maximum penetration of the blades will level out relatively small irregularities. The weight of the roller 62 will create a 'mulching" effect on the ground cleared by the blades, and the roller blades 66 will have an effect similar to plowing a field, to better prepare the site as a seedbed for subsequent seeding.

While the use of the present invention has been described above in the context of clearing range land of noxious shrubs, the present invention may also be used for weed and trash clearance on the shoulders of roadbeds. For example, most roads have an earthen or gravel shoulder that is often the repository of trash and debris deposited by motorists using the roadway. Unwanted plants, weeds and shrubs often grow on these shoulders, and the clearance of such flora and trash is a chore that heretofore was accomplished by teams of volunteers who scour the roadbed picking up the debris. The use of the present invention will not only decapitate or pull up most of the objectionable plants but will wind row the litter for easy retrieval by a volunteer.

It is apparent that numerous modifications or improvements of the present invention may be made to customize the apparatus to a particular site. Therefore, the scope of the present invention is not to be limited by the scope of the description herein, but should be limited solely by the claims appended hereto.

I claim:

1. A towed apparatus for clearing land of loose trash and noxious plants, consisting essentially of:
   a. a scraper member having
      (i) a pair of scraper blades arranged in a "V" with a closed end of the "V" facing in a forward direction, and an open end of the "V" facing in a rearward direction,
      (ii) each of said scraper blades having a replaceable knife affixed to a lower portion thereof;
   b. a roller member having a plurality of removable blades mounted thereon, said roller member being positioned behind the scraper member; and
   c. a frame member for maintaining an appropriate configuration of the scraper member and the roller member and for attaching the towed apparatus to a towing vehicle, wherein the frame member comprises a hitch bar attaching the frame member to the towing vehicle, one or a plurality of braces, one of which is affixed to the hitch bar and slidably attached to the scraper blades at the open end of the "V", and a guideway means having an open slot which the hitch bar passes through and affixed to the scraper blades at the closed end of the "V" in the forward direction, whereby the scraper member floats relative to the frame member over irregularities of the ground surface.

2. The towed apparatus of claim 1 further comprising a plurality of towed apparati gangs mounted and adjacent to one another.

3. The towed apparatus of claim 2 wherein one of the scraper blades is elongated in a rearward direction to ensure total coverage of the apparatus of a portion of such land.

4. The towed apparatus of claim 1 wherein the angle of the "V" is about 65 degrees.

5. The towed apparatus of claim 1 wherein the removable blades are mounted to the surface of the roller member at an angle to the axis about which the roller member rotates.

6. The towed apparatus of claim 1 wherein the roller member is removably filled with water.

7. The towed apparatus of claim 1 wherein a seeding device is affixed to the apparatus such that seeds are planted in the wake of the scraper blades and roller.

* * * * *